US 6,609,864 B1

(12) United States Patent
Fischer

(10) Patent No.: US 6,609,864 B1
(45) Date of Patent: Aug. 26, 2003

(54) METHOD AND SYSTEM FOR MINIMIZING THE MEMORY REQUIREMENTS OF A COLOR IMAGE PRINTING DEVICE

(75) Inventor: Todd Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 09/668,608

(22) Filed: Sep. 22, 2000

(51) Int. Cl.[7] ............................................. G06F 15/00
(52) U.S. Cl. ......................................................... 410/76
(58) Field of Search ............................ 400/76; 358/1.2, 358/1.7, 1.8, 448, 453, 538; 395/114

(56) References Cited

U.S. PATENT DOCUMENTS

| | | | |
|---|---|---|---|
| 5,854,886 A | * 12/1998 | MacMillan et al. | 395/114 |
| 6,018,400 A | 1/2000 | Blair | 358/1.9 |
| 6,172,766 B1 | * 1/2001 | Honma | 358/1.2 |
| 6,356,358 B1 | * 3/2002 | Kakutani et al. | 358/1.7 |

* cited by examiner

*Primary Examiner*—Anh T. N. Vo

(57) ABSTRACT

The danger of a page punt error in a color image printing device and the memory requirements of the printing device can be simultaneously minimized by a system in which image data is downloaded to the printing device one color plane at a time. The image data is then provided from the printer's formatter to the print engine, and the printing of any particular color plane is not commenced, only when all the data for that particular color plane is received and buffered in the formatter. In this way, the printer need not wait until all the data for the entire image, i.e., all four color planes, are received and buffered before commencing printing. Moreover, the printer need not include sufficient memory to store all the data for the entire color image at once. Rather, memory need only be provided sufficient to store or buffer a single color plane of the image at any given time.

26 Claims, 3 Drawing Sheets

METHOD AND SYSTEM FOR MINIMIZING THE MEMORY REQUIREMENTS OF A COLOR IMAGE PRINTING DEVICE

FIELD OF THE INVENTION

The present invention relates to the field of color image printing. More specifically, the present invention relates to a method and system for reducing the memory used and required by a color image printing device when receiving image data for printing.

BACKGROUND OF THE INVENTION

Laser printers receive image data from various devices, known generally as printer client devices. Printer client devices may include, but are not limited to, such devices as personal computers, servers, and the like. The image data is generally buffered within the printer as it is received and then sent to a print engine that causes the image to be reproduced on a print medium, such as a sheet of paper, using the toner supplied within the printer.

Laser printers are synchronous print engines, meaning that once the printing of a page has begun, the paper will be moved through the printer at a constant speed as the image is printed. The paper or other print medium continues to move at that constant speed until the printing is complete. The same is true of a color printer in which separate color components of the image are sequentially printed on an intermediate transfer belt and then transferred to paper or another print medium when the image is complete.

Because the movement of the paper or intermediate transfer belt is continuous, the image data must be available to the print engine at least as quickly as is required to keep pace with the movement of the paper. The image data is buffered by the printer's formatter and then passed by the formatter to the print engine. The print engine then drives the mechanisms of the printer to produce the printed image represented by the image data.

Problems occur, for example, it the data from the formatter does not keep up with the movement of the paper so that the paper continues to move while the print engine does not have image data to print, a print error, called a page punt, occurs. The printed image is then disrupted and unacceptable.

In the past, there have been two principal approaches to avoiding page punts. In the first approach, no data is sent to the print engine from the formatter and printing is not commenced until the formatter has received all the data for the image being printed. In this way, there is no possibility that the formatter will run out of data to pass to the print engine during printing. The second approach to avoiding page punts is to provide a communications system between the printer client and the printer's formatter that attempts to ensure that the printer client can and will provide the formatter with additional image data as quickly as needed.

Most current laser printers adopt the first approach and require that all image data be received and buffered by the formatter before printing is commenced. At least one current laser printer on the market attempts to provide an assured system of data communication between the printer client and the formatter using, for example, the Windows® Printing System (also called at-work printing or resource based printing architecture).

The problem with this approach is that the system that attempts to ensure timely communication between the printer client and the formatter is very dependent on the characteristics of the printer client, the input/output system, the operating system of the printer client, and the other demands being placed on the printer client device. Consequently, this approach is extremely difficult to generalize so as to be widely applicable.

However, the alternate approach of holding the print job until all the image data is received by the formatter also has problems. For example, this approach requires a delay of time to transmit all the image data to the printer before printing can begin. Additionally, the memory in the printer must be expansive enough to store all the data required by the image being printed. The cost of providing sufficient memory for this function obviously adds to the overall cost of the printer.

In fact, the memory required to buffer the data for an entire color image can be very large. By way of comparison, a monochromatic image printed at a density of 1200 dots per inch (DPI) on a letter size sheet of paper requires approximately 16 megabytes of data [1200 pixels/inch * 1200 pixels/inch * 8.5 inches * 11 inches * (1 byte/8 pixels)≈16 Mbytes]. The data required for a full color image is much greater. For a example, at 24 bits per pixel, a single color component or color plane for a 600 DPI letter sized image requires approximately 96 megabytes of data [600 pixels/inch * 600 pixels/inch * 8.5 inches * 11 inches * 3 bytes/pixel) ≈96 Mbytes]. Typically, there are four color components or color planes in a full color image, cyan (C), yellow (Y), magenta (M) and black (K). When four separate color planes are being used to define the image, the total amount of data required increases to 600 pixels/inch * 600 pixels/inch * 8.5 inches * 11 inches * 4 bytes/pixel ≈128 Mbytes.

Of course, compression techniques can be, and are used, to reduce the amount of data actually transmitted to and buffered by a color image printing device. However, the demands on the memory of the printing device are clearly great and add to its production cost. Consequently, there is a need in the art for a method and system of providing data to a color image printing device that prevents the possibility of a page punt error while also minimizing the demands placed on the memory of the color image printing device receiving the color image data.

SUMMARY OF THE INVENTION

The present invention provides a system and method of providing image data to a color image printing device that avoids page punt errors while also minimizing the demands placed on the memory buffer of the color image printing device. Consequently, the present invention address the problems in the prior art noted above.

In a preferred embodiment, the present invention may be described as a color image printing system that includes a printer driver in a printer client device that transmits image data to an image printing device one color plane at a time. The image printing device begins printing a color plane on a print medium only after all data for that color plane is received from the printer client device and buffered in the image printing device. Preferably, the printer driver begins transmitting image data for a subsequent color plane to the image printing device as soon as the image printing device begins printing a color plane, the data for which is already completely received by the image printing device.

In this way, the printing can commence more quickly, i.e., after roughly a quarter of the image data, the data for a single color plane, is transmitted. Page punts are avoided since the printer can pause between printing color planes without generating an error, and the memory requirements of the image printing device are reduced to that sufficient to buffer data for only a single color plane at a time.

The printer driver of the present invention preferably includes a rasterizer function for rasterizing the image data; and a color plane separating function for separating the image data by color plane. The image printing device preferably includes a formatter which receives the image data for each color plane in sequence from the printer client device. The formatter passes data for a particular color plane to the print engine of the image printing device only after all data for that color plane is received from the printer client device and buffered in the image printing device.

In a specific preferred embodiment, the printer client device is a host computer running an application under an operating system, such as Windows®, Macintosh O/S® and UNIX. The application generates the image data and passes the image data to the printer driver for rasterization, color plane separation and downloading to the printer.

The present invention also encompasses the methods of making and operating the system described above. For example, a method of the present invention includes the steps of transmitting image data one color plane at a time to an image printing device from a printer driver in a printer client device; and beginning printing a color plane on a print medium with the image printing device only after all data for that color plane is received from the printer client device and buffered in the image printing device.

The present invention also encompasses the computer-readable instructions (software, firmware, etc.) required to operate a printing system in the manner described above. Specifically, the present invention encompasses computer-readable instructions stored in media for recording computer-readable instructions for causing processing devices in a printer client device and an image printing device to transmit image data one color plane at a time to the image printing device from the printer client device; and begin printing of a color plane on a print medium with the image printing device only after all data for that color plane is received from the printer client device and buffered in the image printing device.

BRIEF DESCRIPTION OF THE DRAWINGS

The accompanying drawings illustrate preferred embodiments and features of the present invention and are a part of the specification. Together with the following description, the drawings demonstrate and explain the principles of the present invention.

DETAILED DESCRIPTION OF THE PREFERRED EMBODIMENTS

Figure 1:
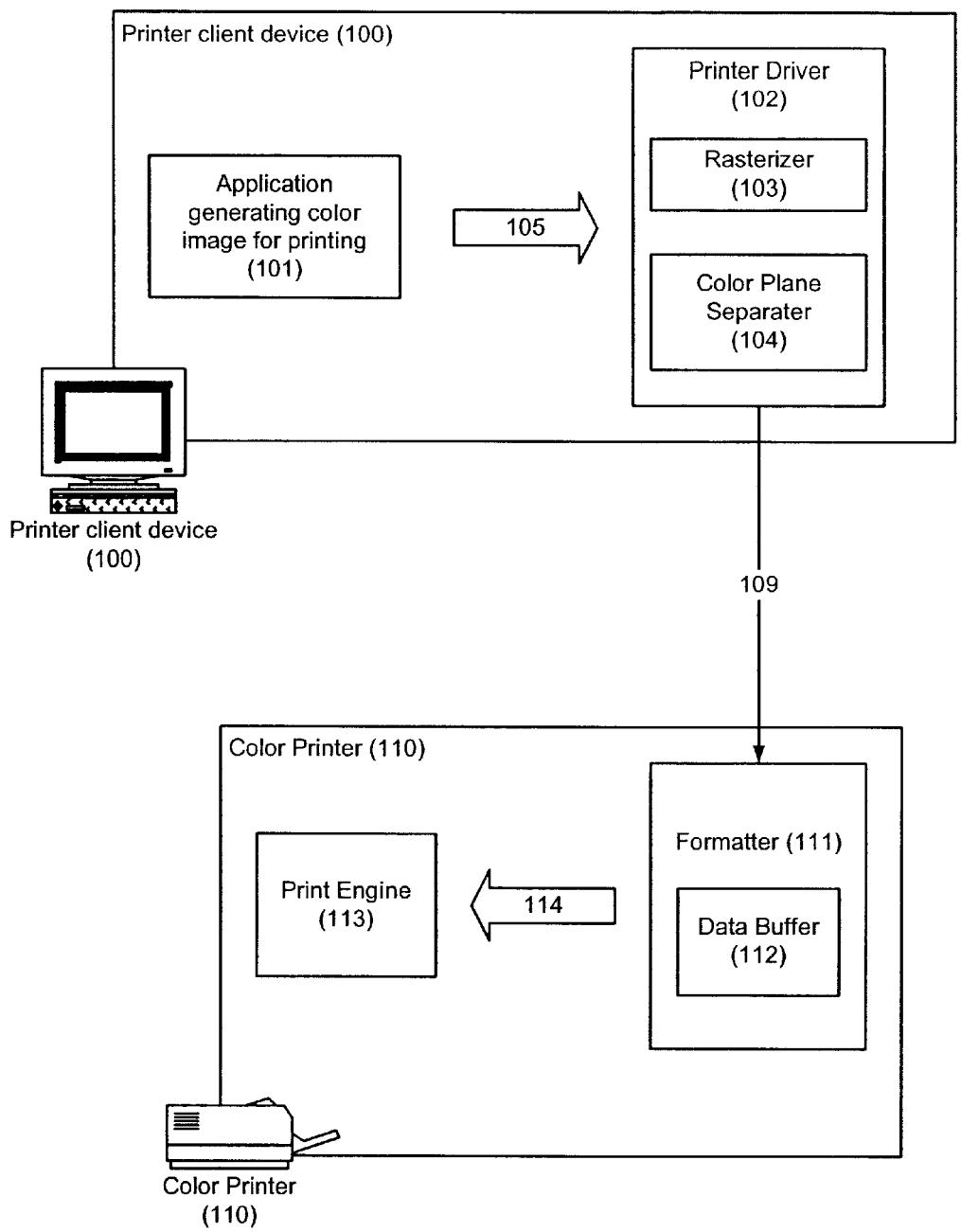
FIG. 1 a block diagram illustrating a first preferred embodiment of the present invention.

Using the drawings, the preferred embodiments of the present invention will now be explained. As used herein, the term "printer" will be understood to encompass any and all image printing devices that receiving a data stream representing an image and, from that data stream, print the represented image on a print medium, for example, a sheet of a paper. The term "print medium," as used herein, will be understood to encompass paper, paper-based products and sheets or planar sections of all other material on which an image may be printed The term "print medium" will also be understood to further encompass an intermediate transfer belt or similar device on which an image is built up before being transferred to another print medium.

In general, there are two types of color printers, single-pass (or in-line) color printers and four-pass color printers. A single-pass or in-line color printer prints all four of the color components or color planes of the image (i.e., cyan (C), yellow (Y), magenta (M) and black (K)) nearly simultaneously, i.e., in one-pass over the print medium. In contrast, a four-pass color printer makes four passes over the print medium, printing a separate color plane on each pass.

In a four-pass color printer, the print engine cannot pause or stop during the printing of a particular color plane. Consequently, the data for that color plane must be provided continuously and at an appropriate rate from the printer's formatter to the print engine during the printing of that color plane. Otherwise, a page punt, as described above, occurs. However, the print engine can stop or pause between the printing of different color planes without causing a page punt or other printer error.

The present invention is applied most advantageously to a four-pass color printer. Under the principles of the present invention, image data is not provided from the printer's formatter to the print engine, and the printing of any particular color plane is not commenced, until all the data for that particular color plane is received and buffered by the formatter.

In this way, the printer need not wait until all the data for the entire image, i.e., all four color planes, are received and buffered before commencing printing. Moreover, the printer need not include sufficient memory to store all the data for the entire color image at once. Rather, memory need only be provided sufficient to store or buffer a single color plane of the image at any given time. Consequently, the memory requirements of the printer are minimized.

For example, under the principles of the present invention, the printer may need only a quarter of the memory (i.e., enough to hold the data for one of four color planes) that would be required if the printer where attempting to buffer all the data for the entire color image (i.e., data for all four color planes) at once. For example, the printer may need only 32 Mbytes to hold the data for a single color plane of the image as opposed to 128 Mbytes required to store the entire data set for all four color planes, i.e., the entire image. Even less memory will suffice if data compression techniques are used.

Additionally, the possibility of a page punt is avoided. Printing preferably commences only when all the data for a color plane has been obtained. When that color plane is finished, printing can be paused without a page punt occurring while the data for the next color plane is received. The process then repeats until all four color planes have been received and printed, and the printed image is complete. To increase the overall speed of the printer, the transmission of data for a subsequent color plane can commence as soon as the printing of the current color plane begins and the data for that current color plane begins draining from the printer's buffer.

The present invention will now be more fully explained with reference to the drawings. FIG. 1 illustrates a printer client device (100) and a color printer (110). The printer client device (100) may be, but is not limited to, a personal computer, a mainframe computer, a server, a scanner, a modem, a fax machine, a video camera, a video cassette recorder, a digital video disc or laser disc player, personal digital assistant, wireless telephone or any other device capable of generating or transmitting image data for printing by the printer (110).

A connection (109) is provided between the printer client device (100) and the color printer (110) over which the client device (100) can transmit image data in the form of print jobs to the printer (110). The connection (109) may be a direct serial or parallel connection between the client device (100) and printer (110). Alternatively, the connection (109) may be over a local area network (LAN) or a wide area network (WAN). The connection (109) may also be a wireless connection or any other connection over which data can be transferred from a printer client device to an image printing device.

In the example illustrated in FIG. 1, the printer client device (100) is a computer running an application (101) that generates data representing a color image which is to be printed. This image data (105) is passed to the printer driver (102) that is also running on the computer (106). The printer driver (102) comprises two functions that are performed on the image data (105). First, a rasterizer function (103) rasterizes the image data (105) to prepare the data (105) for the printer (110). Next a color plane separating function (104) separates the data into color planes matching the toner in the printing device, typically four color planes: cyan (C), yellow (Y), magenta (M) and black (K).

Under the principles of the present invention, the printer driver (102) then transmits the data corresponding to a single color plane over the connection (109) to the printer (110). The printer (110) will likely have a predetermined order in which the four color planes are to be printed. If so, the printer driver (102) will be programmed to transmit the data for the color planes in the sequence required by the printer (110). However, those skilled in the art will appreciate that the order in which the color planes are transmitted to the printer (110) is not critical to the invention and can be arranged to optimize the functioning of the particular printer (110) being used.

The color plane data is received in the printer (110) by the printer's formatter (111) which stores the data in a buffer (112). As noted above, the buffer (112) need only be large enough to contain the data for the largest single color plane that the printer (110) is capable of printing. When all the data for a particular color plane is received and buffered, the formatter passes the data (114) to the print engine (113) which drives the mechanisms of the printer (110) to print that color plane on a print medium.

Because printing is, delayed until the entire color plane is stored in the buffer (112), the possibility of a page punt error is avoided since the printer is assured of having all the data for the color plane before the printing of that color plane commences. If the printer is then required to pause between printing that color plane and the next, no page punt occurs. To minimize any delay between the printing of color planes, the data for the next color plane can begin downloading to the printer (110) as soon as printing of the current color plane begins and the data for that color plane begins draining from the buffer (112).

Additionally, data compression can be used after the color plane separator (104) to facilitate transmission of the image data to the printer (110). Data decompression can be performed in the printer (110) either before or after the data is buffered in the buffer (112). Data compression and decompression functions are not illustrated in FIG. 1.

Figure 2:
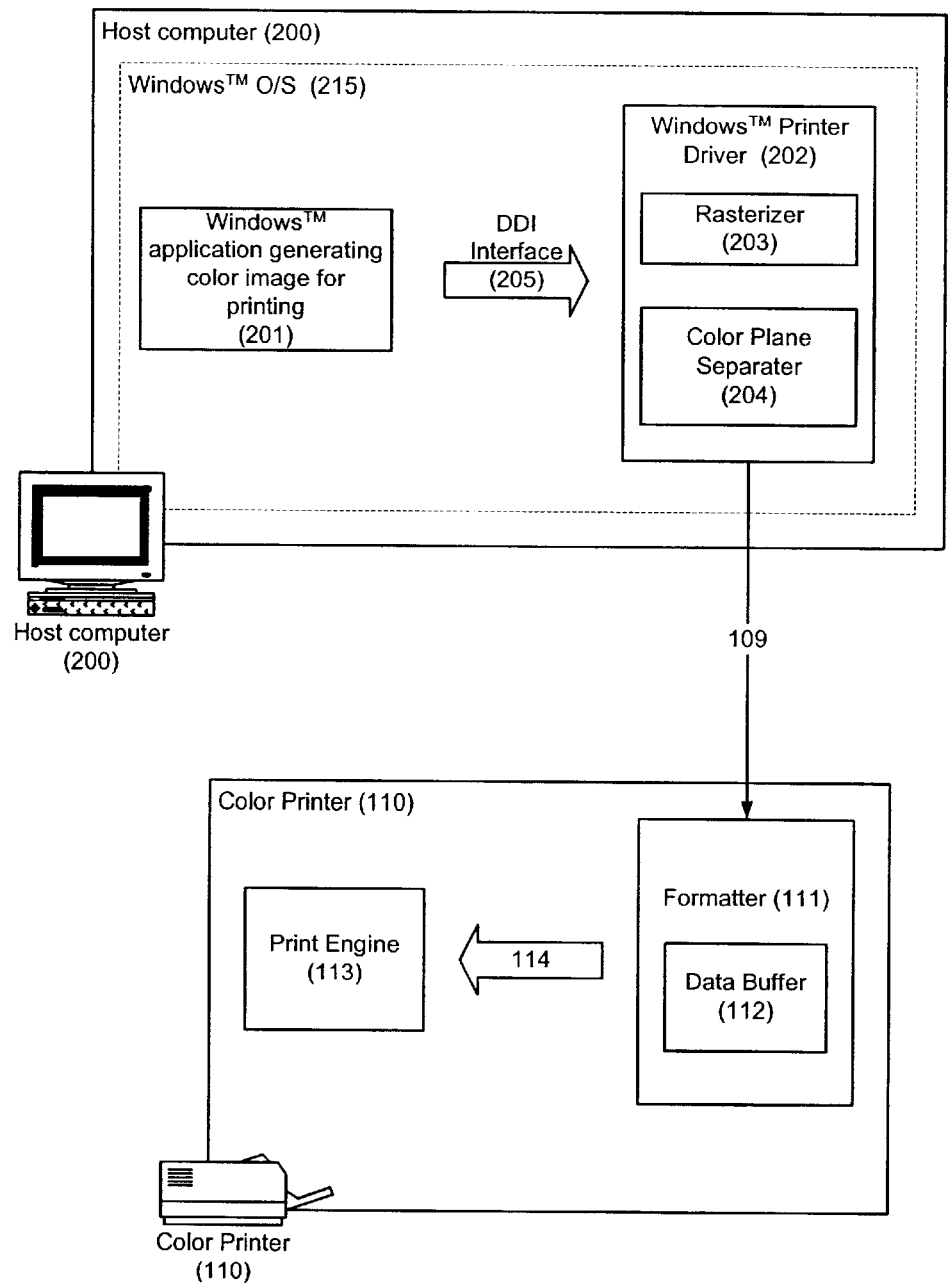
FIG. 2 a block diagram illustrating a second preferred embodiment of the present invention implemented in a system running the Microsoft® Windows® operating system.

FIG. 2 illustrates a more specific example of the system illustrated in FIG. 1. This specific example is also a preferred embodiment of the present invention. In the example of FIG. 2, the printer client is a host computer (200) running a Microsoft® Windows® operating system (215). Under the operating system (215), a Windows-based application (201) generates data representing a color image to be printed.

The image data is passed through a Device Driver Interface (DDI) (205) to the Windows® printer driver (202). As before, the Windows® printer driver (202) comprises a rasterizer function (203) and a color plane separating function (204). The image data is accordingly rasterized and separated by color plane.

The processed image data is then transmitted over the connection (109) to the printer (110). The connection (109) can be any of the connection types described above, or any other connection over which data can be transferred from a printer client device to an image printing device.

As before, the data is transmitted one color plane at a time to the formatter (111) from the printer driver (202). When the formatter (111) has received all the data for a particular color plane and buffered that data in the buffer (112), the formatter (111) then begins sending the data to the print engine (113) over a data path (114). The printer engine (113) can then be assured of continuously receiving all the data for that color plane at an appropriate rate so that no page punt occurs.

Figure 3:
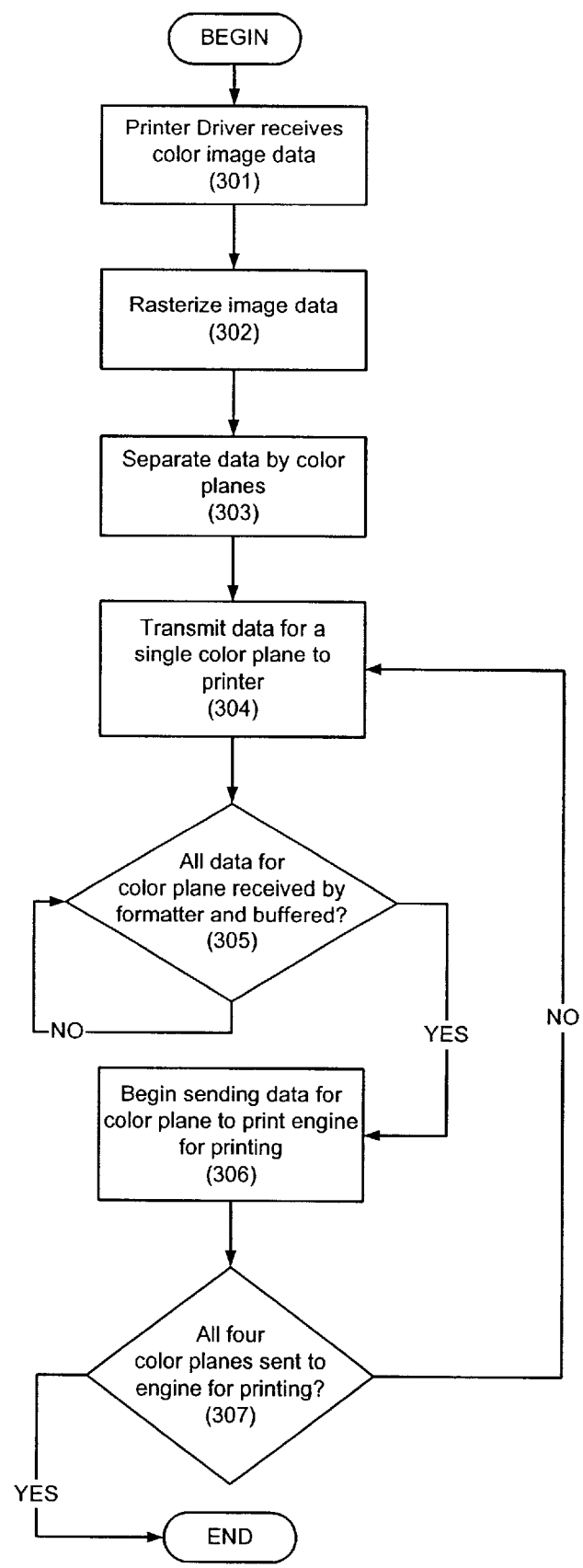
FIG. 3 is a flowchart illustrating a method of the present invention.

FIG. 3 is a flowchart further detailing the underlying method and principles of the present invention. As shown in FIG. 3 and as discussed above, the printer driver of the printer client receives the color image data (301). The printer driver then rasterizes the data (302) and separates the data by color plane (303). data representing a single color plane is the transferred to the printer (304). The printer waits to receive all the data for that color plane. If all the data has not been received, the printer waits for the complete transference of the data (305). When all the data for the color plane has been received, the formatter of the printer begins sending the data for the color plane to the print engine for printing (306).

If the color plane being printed is the last of the color planes, e.g. fourth of four, the process terminates with the printing of the color plane the data for which is in the printer buffer (307). If, however, there remain one or more color planes to print, the data for the next color plane is then downloaded to the printer (307, 304).

In this way, as described above, the printer receives data for one color plane at a time. The printer is then assured of having the data required to complete the printing of the color plane and no page punt occurs, even if the printing must pause between different color planes. Additionally, the printer or image printing device need have only enough memory to buffer the data set for a single color plane. If multiple pages are being printed, this entire process repeats for each page being printed.

As will be understood by those skilled in the art, the present invention also encompasses the computer-readable instructions required to cause the printer driver to transmit the image data to the printer one color plane at a time and to cause the printer to delay printing each color plane until all the data for that color plane has been received and buffered in the printer. As used herein, computer-readable instructions include, but are not limited to, software, software subroutines, application extensions, and other computer code regardless of the language in which it is written or the level at which it is written (i.e., source code, object code, etc.). Computer-readable instructions as used herein also include firmware, application specific integrated circuits (ASICs) and any other means of causing a processing device to perform a specific function. As used herein, a processing device will be understood to include any device for executing computer-readable instructions to perform the function intended, for example, a host computer, a microprocessor, an ASIC or the like.

In implementing the present invention, the system of computer-readable instructions will preferably include computer-readable instructions incorporated in, or accessible to, the printer driver to cause the printer driver to transmit the image data to the printer one color plane at a time. Additionally, the system of computer-readable instructions of the present invention will also preferably include computer-readable instructions in the printer which are incorporated in, or are accessible to the formatter, to cause the formatter to delay transmission of the image data to the print engine and the printing of each color plane until all the data for that color plane has been received and buffered in the printer.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A color image printing system comprising:
  a printer driver in a printer client device that transmits image data, which comprises data for a plurality of color planes, to an image printing device, wherein said printer client transmits said image data to said image printing device one color plane at a time; and
  said image printing device that receives and buffers said image data and begins printing a color plane on a print medium as soon as all data for said color plane is received from said printer client device and buffered in said image printing device.

2. The system of claim 1, wherein said printer driver comprises:
  a rasterizer function for rasterizing image data; and
  a color plane separating function for separating image data by color plane.

3. The system of claim 1, wherein said image printing device further comprises a formatter which receives said image data for each color plane in sequence from said printer client device.

4. The system of claim 3, wherein said formatter passes data for said color plane to a print engine of said image printing device only after all data for said color plane is received from said printer client device and buffered in said image printing device.

5. The system of claim 1, wherein said printer client device is a host computer running an application under an operating system, where said application generates said image data and passes said image data to said printer driver.

6. The system of claim 1, wherein said printer driver begins transmitting image data for a subsequent color plane to said image printing device as soon as said image printing device begins printing a color plane the data for which is already completely received by said image printing device.

7. A method of printing color images, the method comprising
  transmitting image data comprising data for a plurality of color planes, wherein said image data is transmitted one color plane at a time to an image printing device from a printer driver in a printer client device, wherein said image printing device receives and buffers said image data; and
  beginning printing of a color plane on a print medium with said image printing device as soon as all data for the color plane is received and buffered in said image printing device.

8. The method of claim 7, further comprising
  rasterizing said image data; and
  separating said image data by color plane for sequential transmission of each set of color plane data to said image printing device.

9. The method of claim 7, further comprising receiving said image data for each color plane in sequence from said printer client device with a formatter of said image printing device.

10. The method of claim 9, further comprising
  passing data for the color plane with said formatter to a print engine of said image printing device when all data for that color plane is received from said printer client device and buffered in said image printing device.

11. The method of claim 7, wherein said printer client device is a host computer running an application under an operating system, where said application generates said image data and passes said image data to said printer driver.

12. A color image printing system comprising:
  first means in a printer client device for transmitting image data comprising data for a plurality of color planes to an image printing device, wherein said image data is transmitted to said image printing device one color plane at a time; and
  second means in said image printing device for printing a color plane on a print medium as soon as all data for said color plane is received from said printer client device and buffered in said image printing device.

13. The system of claim 12, wherein said first means comprise:
  means for rasterizing image data; and
  means for separating image data by color plane.

14. The system of claim 12, wherein said second means in said image printing device comprise a formatter which receives said image data for each color plane in sequence from said first means in said printer client device.

15. The system of claim 14, wherein said formatter passes data for said color plane to a print engine of said image printing device only after all data for that color plane is received from said printer client device and buffered in said image printing device.

16. The system of claim 12, wherein said printer client device is a host computer running an application under an operating system, where said application generates said image data and passes said image data to said first means.

17. Computer-readable instructions stored in media for recording computer-readable instructions, said computer-readable instructions comprising instructions for causing processing devices in a printer client device and an image printing device to:
  transmit image data one color plane at a time to said image printing device from said printer client device; and begin printing of a color plane on a print medium with said image printing device as soon as all data for said color plane is received from said printer client device and buffered in said image printing device.

18. The computer-readable instructions of claim 17, further comprising instructions for causing a printer driver of said printer client device to:

rasterize said image data; and separate said image data by color plane for sequential transmission of each set of color plane data to said image printing device.

19. The computer-readable instructions of claim 17, further comprising instructions for causing a formatter in said image printing device to receive said image data for each color plane in sequence from said printer client device and buffer said image data for a particular color plane in a memory unit of said image printing device.

20. The computer-readable instructions of claim 19, further comprising instructions for causing said formatter to pass data for a particular color plane to a print engine of said image printing device only after all data for that color plane is received from said printer client device and buffered in said image printing device.

21. A method of printing color images, the method comprising transmitting image data comprising data for a plurality of color planes, wherein said image data is transmitted one color plane at a time to an image printing device that receives and buffers said image data;

beginning printing of a first color plane on a print medium with said image printing device when all data for said first color plane is received from said printer client device and buffered in said image printing device; and transmitting data for a second color plane to said image printing device during said printing of said first color plane.

22. The method of claim 21, further comprising printing said second color plane on said print medium when all data for said second color plane is received from said printer client device and buffered in said image printing device.

23. The method of claim 22, further comprising transmitting data for a third color plane to said image printing device during said printing of said second color plane.

24. The method of claim 23, further comprising printing said third color plane on said print medium when all data for said third color plane is received from said printer client device and buffered in said image printing device.

25. The method of claim 24, further comprising transmitting data for a fourth color plane to said image printing device during said printing of said third color plane.

26. The method of claim 25, further comprising printing said fourth color plane on said print medium.

* * * * *